May 31, 1960     A. H. FAULKNER     2,939,018
TRANSISTOR TRIGGER CIRCUIT
Filed Dec. 9, 1955
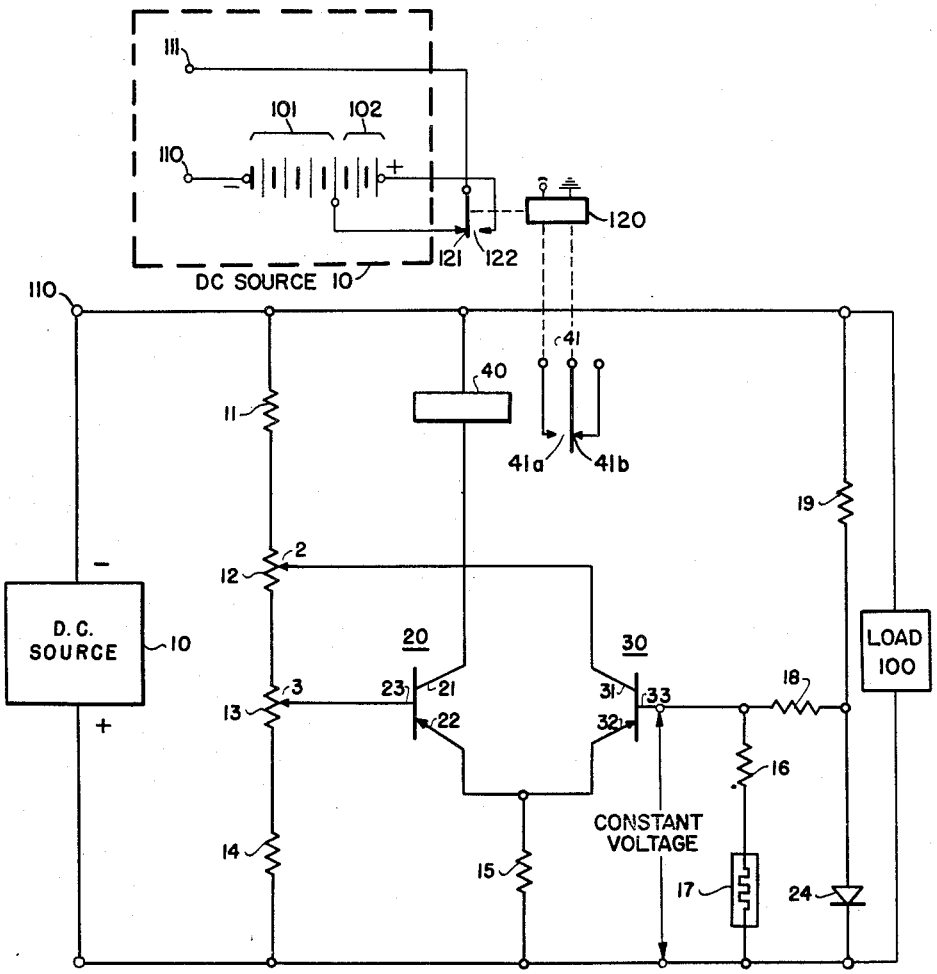
INVENTOR.
ALFRED H. FAULKNER
BY
ATTY.

United States Patent Office 2,939,018
Patented May 31, 1960

2,939,018

TRANSISTOR TRIGGER CIRCUIT

Alfred H. Faulkner, Chicago, Ill., assignor to General Telephone Laboratories, Incorporated, a corporation of Delaware Filed Dec. 9, 1955, Ser. No. 552,041

6 Claims. (Cl. 307—88.5)

This invention has as its object the detection of voltage variations within a direct current supply circuit, and through the use of transistors to trigger a relay into operation or release, in response to these voltage variations. The contacts of the relay could be used to switch in an external circuit consisting of, for example, an auxiliary voltage supply such as a bank of batteries or generator.

An ideal use for the circuit would be in a system such as a telephone power supply. Normally the power is supplied by a mechanically generated main source operating on commercial power. As a standby source, batteries are usually floated on the line with an added reserve consisting of additional booster batteries or end cells. The use of end cell switches as may be used herein are shown generally on page 279 on Storage Battery Engineering by L. Lyndon published by McGraw Hill in 1910. In case of failure of the commercial power and subsequent failure of the mechanical generator, the standby batteries would assume the load. After a short period, the battery voltage would begin dropping. When this voltage had dropped to the minimum necessary to maintain the exchange, the regulator of the present invention could be used to switch end cells into the supply circuit. When the main source had been restored and the batteries had recharged to the "floating" voltage level, the voltage control unit would function to switch the end cells out of the supply system. This usage is illustrative of the many applications for which my invention could be used.

Voltage control circuits which employ either relays or vacuum tubes as the voltage sensitive elements are well-known and generally used. While these may prove acceptable for many applications they do not provide the accuracy and ease of adjustment of my invention. Another advantage of the present invention is that the voltage sensing unit may be located at a remote distance from the actuating relay allowing more freedom in positioning equipment.

Currently, most transistor trigger and switching circuits utilize the negative resistance characteristics of the point contact transistor. A little slower in operation but much more stable and efficient is the junction transistor. The junction transistor or surface barrier transistor as may be used herein, provides a stable two-state operation with marked advantages such as: lower cut-off current and less voltage drop on conduction. These two factors alone provide a much higher degree of efficiency than the point contact transistor is capable of.

The present circuit also provides a regenerative feedback to instantaneously transfer the change of current from one transistor to another. In this manner, when one transistor is snapped into conduction, the other undergoes a voltage reversal to supplement the operation of the first transistor. In this manner the resultant currents fed to the relay are of sufficient magnitude to obtain immediate, positive relay action. There is no hesitancy in the relay operation and release to form a true trigger action.

The present invention utilizes a bridge circuit connected across the source of varying voltage with the two transistors used to detect and respond to voltage differences connected between the arms. One arm is a voltage divider to supply a proportion of the line voltage to the base of one transistor. The other arm consists of a constant voltage system producing a reference voltage which is impressed on the base of the second transistor and against which the proportion of the line voltage is compared. The resultant action acts to operate the release of the switching relay.

The reference voltage is obtained by the use of a silicon p-n junction diode. Diodes of this type exhibit the characteristic known as the "Zener Effect" when the diode is biased in the reverse direction. At low reverse voltages, the diode exhibits the usual tendency to high resistance and low current. As the voltage is increased, the current increases until the "saturation" voltage is reached. In this "saturation" region, as the applied voltage is increased, the current increases very rapidly so that the overall effect is a constant voltage drop across the diode. This drop is relatively steady over a wide range of voltages. The "saturation" voltage is a constant for each diode and diodes can be manufactured with this parameter ranging from a few volts to a few hundred volts.

In the "saturation region" however, the voltage drop across the diode increases slightly with increases of ambient temperature. Since this increase bears no relation to the input voltage, temperature compensating devices must be used to maintain the constant reference voltage. A resistor having a negative temperature coefficient, commonly called a thermistor, is connected in series with a low value resistor and bridged across the diode. To share and be affected by the same ambient temperature as the silicon diode, the thermistor should be placed as close physically to the diode as is possible. The reference voltage is taken from across the thermistor and is equal to the nearly constant diode drop less the small drop across the low value resistor. Since the current through this resistor increases with increasing temperature due to the decreasing thermistor resistance, the rise in diode voltage can be compensated for.

The circuit also allows sensitive adjustment and calibration of both the pick-up and drop-out voltages. These adjustments can be readily set to operate the circuit on voltage variations of one tenth of a volt in the fifty volts generally used.

In the present circuit, p-n-p type junction transistors are shown and used, but with minor obvious circuit changes, surface barrier or n-p-n type junction transistors could be used.

The specific operation and features of my invention will more readily be understood when viewed in conjunction with the drawing and explanation of the circuit. Referring to the drawing, there is provided a source of unregulated direct current 10 which supplies both the circuit of the invention and the external load circuit.

Connected across the source 10 are the arms of the bridge circuit. One arm, a voltage divider, is composed of fixed resistors 11 and 14 and potentiometers 12 and 13 with their respective sliders 2 and 3. The other bridge arm consists of the resistor 19, a high value resistor, and the reference voltage unit. This unit includes the silicon junction diode 24, thermistor 17, low value resistor 18 and heavy resistor 16. Resistor 16 is provided in series with thermistor 17 to limit the power dissipation and so minimize the self-heating effect of the particular thermistor. Also connected across source 10 is the load 100.

The two n-p-n type transistors 20 and 30 are connected across the bridge. Base 23 of transistor 20 is connected to the slider of potentiometer 13 to receive the proportion of the source voltage which is to be compared against the reference voltage. The reference voltage is fed into base 33 of transistor 30. Emitters 22 and 32 are commonly connected through resistor 15 to the positive source terminal. The collector 31 of transistor 30 is connected to the slider of potentiometer 12 in the voltage divider. The collector circuit of transistor 20 is connected through relay 40 to the negative source terminal. Relay springs 41 provide means for controlling the output circuit to the external control circuit used in the particular application.

The operation of the circuit is as follows:

When the bridge circuit of the present invention is connected to the voltage source, one transistor will become conductive. On a high voltage condition, transistor 20 will conduct, and on low voltage, transistor 30 will conduct.

When the voltage across source 10 rises, the voltage drop across resistor 14 and resistor 13 to its slider 3, will become greater than that of the constant reference voltage unit including the diode 24. The voltage differential from emitter to base of transistor 20 is thereby increased, causing transistor 20 to conduct. More emitter-collector current will therefore flow through transistor 20. Increased emitter current flows through resistor 15 inducing more voltage drop across this resistor driving emitter 32 more negative than base 33. No current will flow in transistor 30. With these factors aiding the rise of emitter-base voltage in transistor 20, the increase in its emitter-collector current is almost instantaneous. With the surge of current flow from collector 21, relay 40 will operate. On operation of the relay contacts 41, the switching operation in the external circuit is produced. A possible external circuit for the contacts of relay 40 is, as mentioned, that of an end cell switch. For this use a slave relay 120 is connected to contacts 41a. This relay in actuality would be a heavy duty relay or switch as shown in the cited text but its operation in either instance would not differ in principle from that shown in the use of relay 120. On operation of relay 40 and subsequent closing of contacts 41a, a circuit is completed to the slave relay 120. Relay 120 closes its contacts 122 opening contacts 121. A circuit is thereby completed from positive terminal 111, through contacts 122, end cells 102, main battery 101 to negative terminal 110.

When the source voltage decreases toward the adjusted drop-out value, the potential across resistor 14 and that part of resistor 13 on the positive side of slider 3 decreases to the extent that base 23 becomes more positive with respect to the positive source voltage. Less emitter-collector current then flows in transistor 20. Also, due to the negligible amount of resistance in the emitter to base of a p-n-p type transistor which is conducting, the voltage at emitter 22 rises with the rise of base voltage. With the common connections of the emitters, the voltage at emitter 32 becomes more positive with respect to the constant voltage on base 33. Emitter-collector current starts to flow in transistor 30. The current flowing from collector 31 causes an increased voltage drop across resistor 11 and resistor 12 to the slider 2. Base 23 is thereby driven more positive. The cumulative effect of the feedback from the collector 31 on the base 23 drives transistor 20 toward shut-off. When the pre-adjusted drop-out low voltage value is reached, transistor 20 experiences a voltage reversal and no further current flows in its emitter-collector circuit. Relay 40 releases, completing a switching operation in the external circuit. Relay 120 is thereby released closing its contacts 121 and opening contacts 122. The end cell 102 is thereby removed from the source.

The value of voltage at which transistor 20 will begin conduction, as can readily be seen, is due almost entirely to the position of the slider 3 of potentiometer 13. With the slider 3 at the positive end of resistor 13 the voltage drop across resistor 14 alone would determine the base potential of transistor 20; therefore the circuit would respond to high values of source voltage. Conversely, with the slider 3 at the negative end of resistor 13, lower source voltage as compared to the reference voltage would be required to cause transistor 20 to conduct.

When the source voltage builds back up, the voltage drop across resistors 14 and 13 to its slider 3 will increase as has previously been described. Now, with transistor 30 conducting, certain added considerations must be noted. The rate of increase of potential across resistors 14 and 13 to its slider 3 is now dependent also, on the magnitude of the additional voltage drop across resistors 11 and 12 to its slider 2, due to the current from collector 31. As the positive potential at base 23 decreases, the voltage at emitter 32 decreases. More current flows in transistor 20, less flows in transistor 30. Less additional voltage drop is felt across resistors 11 and 12 to its slider 2. Base 23 becomes more negative. Transistor 20 begins conducting. Relay 40 operates. Relay contacts 41 perform another switching operation to the external circuit. Transistor 30 is cut-off. Voltage across the emitter-base of transistor 30 reverses, so that no current flows in transistor 30.

The operations of the circuit occur almost simultaneously, due to the cumulative effect of the feed-back of current from collector 31. The current shared by emitters 22 and 32 is maintained just below the value required for operation of either transistor. Small voltage changes tend to snap the proper transistor into conduction. The positive collector feedback causes this action to be immediate, driving one transistor to operation, the other to cut-off abruptly.

The adjustment of potentiometer 12 is used to determine the range of the operate and release voltages. Potentiometer 13 is used to set the level of voltage at which the relay will drop-out, while the adjustment of potentiometer 12 determines the range of pick-up and drop-out as a differential from the previously set level.

The springs 41 of relay 40 may be used for any desired purpose such as: the cutting in or out of end cells as suggested, or for giving alarm or other signals to indicate the rise or fall of voltage.

Having fully described the operation of the invention, what I consider to be new and desire to have protected will be set forth in the appended claims.

What is claimed is:

1. In a trigger circuit for controlling the operation of an electromagnetic relay, a source of direct current having a voltage capable of variation, a constant voltage device, a first and second transistor each having an emitter, collector and base, means for commonly connecting both said transistor emitters to said source of varying voltage means for applying to the base of said first transistor a proportionate part of said varying voltage, said applying means comprising resistive elements bridging said varying voltage source, means for applying the constant voltage from said device to the base of said second transistor, both said transistors connected to cooperatively compare said proportionate voltage against the voltage at said constant voltage device, an electromagnetic relay having its operative winding connected in the collector circuit of said first transistor, said relay operated responsive to the complete conduction of said first transistor, said second transistor rendered non-conductive on operation of said first transistor, said second transistor having its collector regeneratively coupled to the base of said first transistor to positively feedback thereto and thereby speed the action of said first transistor in its transitions both from and to the conductive state.

2. In a trigger circuit, a direct current source of varying voltage having positive and negative terminals, a resistive voltage divider connected across said source, a constant voltage network connected across said source, said network comprising a silicon diode having Zener characteristics, said diode connected in the reverse direction to the positive terminal of said source, said network further comprising a temperature compensating thermistor parallelly coupled to said diode, a first and a second transistor, each having emitter, base and collector, resistive means commonly connecting the emitters of both said transistors to the posiitve terminal of said source, adjustable means connecting the base of said first transistor into said voltage divider, means connecting said second transistor onto the constant voltage network, the common-resistive connection to the positive terminal of said source from the two transistor emitters effecting comparison of the voltages at each transistor base, means for regeneratively coupling the collector of said second transistor to the base of said first transistor in an adjustable manner, bi-stable control means, means in the collector circuit of said first transistor triggered into operation in response to the conduction of said first transistor, conduction of said first transistor biasing the emitter-base path of said second transistor in a reverse direction thus causing said second transistor to be rendered non-conductive and causing said control means to instantly return to its normal state.

3. A transistor trigger circuit actuated in response to voltage variation from a direct current source of varying voltage, said circuit comprising a first and a second junction transistor, each having emitter, base and collector, a voltage divider connected across said source of varying voltage, said voltage divider composed of plurality of resistors, adjustable means connecting said divider to the base of said first transistor, a constant voltage circuit, means connecting said constant voltage circuit across the source of varying voltage, said constant voltage circuit connected to the base of said second transistor, means commonly connecting the emitters of both said transistors to the source of varying voltage, means including a bi-stable signal device in the collector circuit of said first transistor, said bi-stable device normally maintained inoperative, means connecting the collector of said second transistor into the voltage divider to provide a regenerative feedback to the base of said first transistor, said first transistor rendered conductive in response to a high voltage from said source of varying voltage as reflected by a greater voltage drop across said voltage divider, said greater voltage drop causing a greater emitter base current to flow in said first transistor than in said second transistor, said first transistor thereby rendered conductive, the position of said adjustable means determining the voltage level at which said first transistor will be rendered conductive, said signal device responsive to the conduction of said first transistor to be snapped to the operative state and said second transistor thereby rendered non-conductive.

4. A circuit as claimed in claim 3 in which the means connecting the collector of said second transistor to the voltage divider comprises a differential adjusting potentiometer for determining the range at which said first transistor will cease conduction, said prior mentioned adjustable means comprising a slider type potentiometer for determining the circuit low voltage level through its slider to the base of said first transistor, both said potentiometers respectively conected in series in said voltage divider.

5. A circuit as claimed in claim 3 in which said constant voltage circuit includes a conductive network comprising a silicon diode and a temperature compensating circuit comprising a thermistor closely associated physically with said diode to share a common ambient temperature with said diode in a voltage compensating manner, said temperature compensating circuit shunted across said diode.

6. A voltage sensitive circuit comprising a direct current source of varying voltage having positive and negative terminals, a voltage divider comprising a plurality of serially connected resistors connected across said source, a further circuit connected across said source, said further circuit comprising means for maintaining a control voltage having a constant voltage differential from the source voltage, a first and a second transistor each having an emitter, base and collector, said transistors having a common emitter connection, a resistor for connecting said common emitter connection to the positive terminal of said source, said first transistor base connected into said voltage divider, and said second transistor base connected to said control voltage, said second transistor collector connected into said voltage divider to regeneratively feed back to the base of said first transistor, said first and second transistor combinedly causing said first transistor to become conductive responsive to an increase in voltage at said source, a bi-stable electromagnetic signal device connected to the collector of said first transistor and to the negative terminal of said source, said bi-stable device rendered operative on conduction of said first transistor to emit an output signal.

References Cited in the file of this patent
UNITED STATES PATENTS

| | | |
|---|---|---|
| 2,665,845 | Trent | Jan. 12, 1954 |
| 2,751,545 | Chase | June 19, 1956 |
| 2,759,142 | Hamilton | Aug. 14, 1956 |
| 2,776,382 | Jensen | Jan. 1, 1957 |
| 2,828,450 | Pinkaers | Mar. 25, 1958 |
| 2,838,657 | Wilcox | June 10, 1958 |